United States Patent
Trapp

[15] 3,680,926
[45] Aug. 1, 1972

[54] ENDLESS CLEATED TRACK
[72] Inventor: Robert L. Trapp, Milwaukee, Wis.
[73] Assignee: Outboard Marine Corporation, Waukegan, Ill.
[22] Filed: May 8, 1970
[21] Appl. No.: 33,162

Related U.S. Application Data

[63] Continuation of Ser. No. 750,105, Aug. 5, 1968, abandoned.

[52] U.S. Cl. ..................................305/35 EB, 24/38
[51] Int. Cl. ..............................................B62d 55/24
[58] Field of Search ..........305/35, 38, 37; 24/31, 36, 24/35, 38; 198/189, 193; 74/231

[56] References Cited

UNITED STATES PATENTS 3,011,576  12/1961  Howes..................305/35 EB X
3,510,174  5/1970  Lamb....................305/35 EB X
3,362,492  1/1968  Hansen.................305/35 EB X
2,461,150  2/1949  Flynn.......................305/35 EB Primary Examiner—Richard J. Johnson
Attorney—Robert E. Clemency, John W. Michael, Gerritt D. Foster, Bayard H. Michael, Paul R. Puerner, Joseph A. Gemignani, Andrew O. Riteris, Spencer B. Michael and Robert K. Gerling

[57] ABSTRACT

Disclosed herein is an endless track having a number of belts formed from strips of flexible material having tapered ends and supported for movement in a parallel spaced relation by traction bars having drive sections offset into the space between the belts. The tapered ends of the belts are spliced by a number of the traction bars.

1 Claim, 5 Drawing Figures

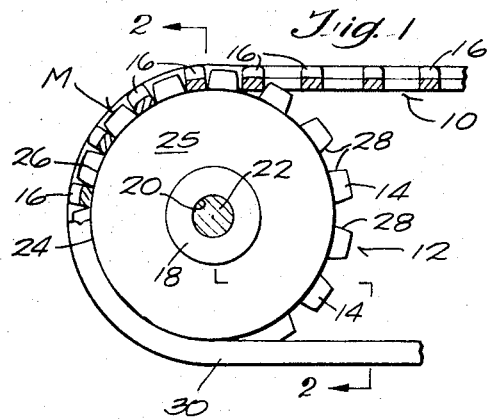
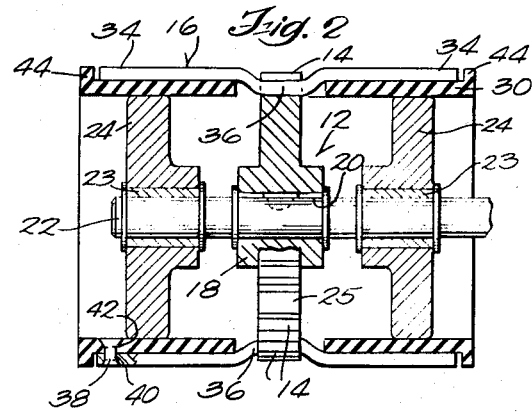
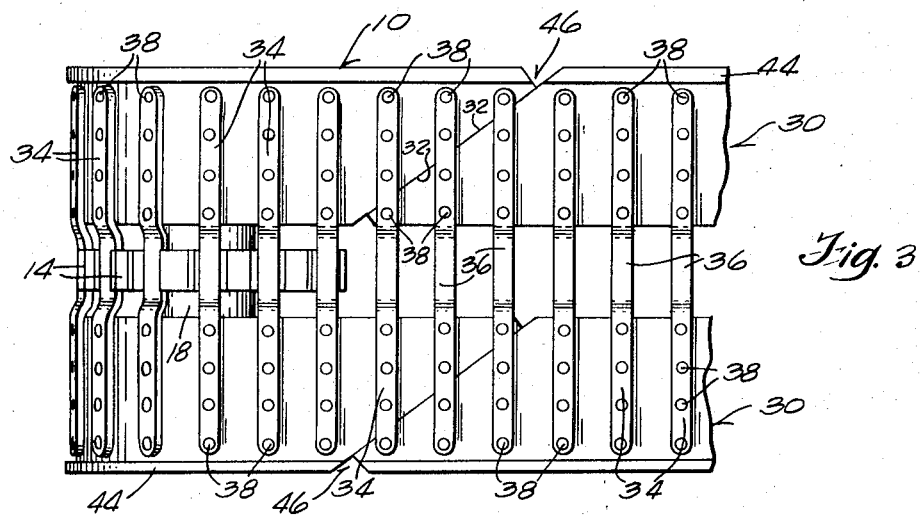
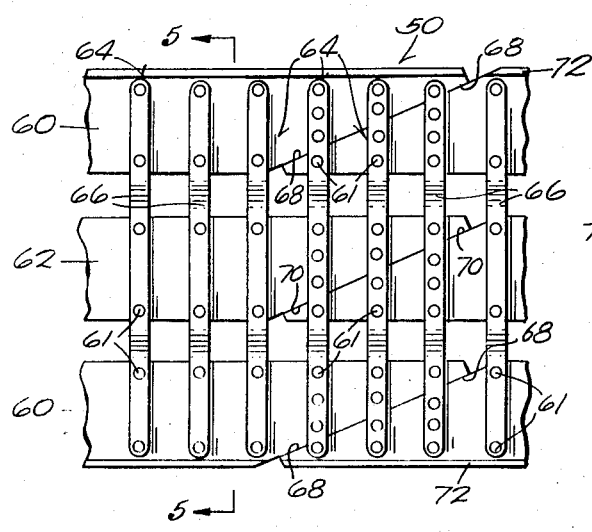
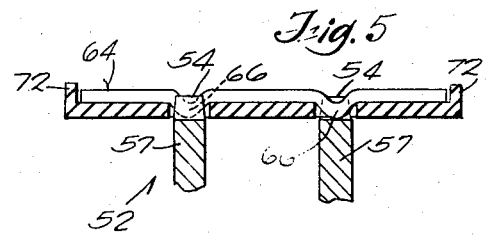

ENDLESS CLEATED TRACK

This is a continuation of Ser. No. 750,105, filed Aug. 5, 1968, now abandoned.

BACKGROUND OF THE INVENTION

Endless tracks, particularly of the type which are used to provide traction for vehicles, commonly include a number of belts interconnected by parallel traction bars or cleats mounted on the outer surface of the belt. The track is mounted on a drive sprocket and driven by gear teeth positioned on the drive sprocket and extending radially outwardly beyond the surface of the belts to sequentially engage the traction bars or cleats mounted on the outer surface of the belts. The spacing between the gear teeth increases as the radial distance from the drive sprocket increases and the spacing between the traction bars increases when the track moves around the outer surface of the drive sprocket. This variation in spacing often results in irregular engagement between the gear teeth and the traction bars. The parallel relation of the traction bars provides little lateral support for the vehicle.

The belts used to make up prior tracks have often been spliced by attaching metal splice halves to the ends of the belts and hingedly interconnecting the splice halves. The mass of the splice halves can set up an objectionable vibration at high speeds.

SUMMARY OF THE INVENTION

An endless track according to the invention includes a number of belts interconnected for movement in a parallel spaced relation by a plurality of traction bars or cleats secured at spaced intervals to the outer surface of the belts with the drive section of each traction bar offset into the space between the belts. The track is mounted on a drive sprocket having radially extending gear teeth arranged to engage the drive sections on the traction bars in the space between the belts. This arrangement in the point or place of driving engagement between the gear teeth and the drive section of the traction bars occurs near the root of the gear teeth where the spacing between the teeth is constant and the spacing between the drive sections remains substantially constant when the belt moves around the drive sprocket. Wear at the outer end of the gear teeth is substantially eliminated since the gear teeth do not extend radially outwardly beyond the outer surface of the belts. Smooth track operation at all speeds is provided by the track disclosed herein by using the traction bars to splice the belts which results in an even distribution of weight in the belts. Ribs or ridges are provided on the belts transverse to the traction bars to improve the lateral stability of the track.

Other objects and advantages of the present invention will become apparent from the following description when read in connection with the accompanying drawings in which:

FIG. 1 is a side view in section of a portion of an endless track mounted on a drive sprocket.

FIG. 2 is a section view of the track and drive sprocket taken on line 2—2 of FIG. 1.

FIG. 3 is a plan view of a point of the track showing the splice for the belts.

FIG. 4 is a plan view of a section of an alternate or modified form of endless track.

FIG. 5 is an end view of the modified track taken on line 4—4 of FIG. 4.

DESCRIPTION OF THE INVENTION

An endless track 10 in accordance with the invention provides positive engagement between the gear teeth 14 on a drive wheel 12 and the traction bars 16 on the track 10 by arranging the point of driving engagement at or near the root of the gear teeth 14. A portion of the endless track 10 is shown in FIG. 1 mounted on the drive wheel 12 which is connected to a power source such as an engine or a transmission of a vehicle. Only the drive wheel 12 is shown in the drawing, however, it should be understood that the endless track 10 is also mounted on idler wheels to hold the track 10 in fairly tight engagement with the drive wheel 12. The endless track 10 is driven by means of the gear teeth 14 on the drive wheel 12 which sequentially engage the traction bars or cleats 16 provided on the endless track 10.

More specifically, the drive wheel 12 includes a central hub 18 having a bore 20 to receive a drive shaft 22 from a power source (not shown). The gear teeth 14 are equally spaced in a circumferential row on the outer surface 26 of a wheel 25 mounted on hub 18. Each gear tooth is in the form of a stub type involute tooth having a curved drive surface 28.

Various means may be used to support the track 10 and in the drawings, the track 10 is shown supported by two wheels 24 mounted to rotate freely on bearings 23 on shaft 22. A cylindrical drum secured to the wheel 25 could also be used to support the track 10.

The endless track 10 shown in FIGS. 1 through 3 includes a pair of flexible belts 30 connected for movement in parallel spaced planes by means of the traction bars 16 spaced at intervals on the belts 30 corresponding to the width of gear teeth 14. The traction bars or cleats 16 each include belt connecting sections 34 and an offset drive section 36. Each traction bar 16 is secured to the belts 30 by means of rivets 38 which pass through apertures 40 provided in the belt connecting sections 34 and apertures 42 in the belts 30 with the drive section 36 offset into the space between the belts.

By locating the drive sections 36 between the belts 30 engagement will occur at or near the root of the gear teeth 14 where the distance between the drive sections 36 remains substantially constant when the track 10 moves around the drive sprocket. This is shown in FIGS. 1 and 2 where the drive sections 36 are shown offset into the plane of the belts 30. The belts 30 ride on the outer surface 26 of the wheel 25 and each drive section 36 is sequentially seated in the space between the radial surfaces 28 of the gear teeth 14. Wear of the outer surface 15 of the gear teeth 14 is substantially reduced, since the outer surface 15 of the gear teeth extends radially outwardly only a distance sufficient to engage the drive sections 36 on the traction bars 16.

The traction bars 16 are also used to splice the belts 30. Each of the belts 30 is formed from a strip of flexible material such as rubber, with the ends 32 cut at a diagonal or taper. The ends 32 of the belts are placed in an abutting relation and a number of the traction bars 16, three shown in FIG. 3, are placed over the ends 32. The rivets 38 in the connecting sections 34 of the traction bars 16 are located on each side of the adjacently located ends 32 of the belts 30. Curling at the ends 32 of the belts 30 is prevented by cutting away a portion 46 of the end of the belt.

In FIGS. 4 and 5 an alternate form of endless track 50 is shown for a drive sprocket 52 having two rows of gear teeth 54 spaced at equal intervals around the outer surface 55 of drive wheels 57. The endless track 50 includes a pair of outside belts 60 and a center belt 62 interconnected for movement in a spaced relation by a number of traction bars 64 spaced at intervals corresponding to the width of the gear teeth 54. Driving engagement between the gear teeth 54 and the traction bars 64 is provided by means of drive sections 66 offset into the spaces between the belts 60 and 62. Each drive section 66, as it is sequentially brought into engagement with the gear teeth on the drive sprocket, will seat in the space between the gear teeth 54.

The belts 60 and 62 are formed from strips of flexible material with tapered ends 68 and 70, respectively. The belts 60 and 62 are spliced by placing the tapered ends 68 and 70 in abutting engagement and placing a number of the traction bars 64 over the ends 68 and 70. The traction bars are secured to the belts by means of rivets 61 with at least one rivet on each side of the tapered ends 68 and 70.

Lateral movement of the endless track 50 on the terrain is prevented by providing upstanding ridges or ribs 72 on the outer edge of the outer belts 60. The ridges 72 extend in a transverse relation to the traction bars 64 and project radially outwardly a distance at least equal to the height of the traction bars. This invention also includes an endless track formed from a single belt. In this case, the traction bars should be mounted on the flexible belt with the drive sections offset along each outside edge of the belt. This type of endless track can be mounted on and driven by a drive sprocket having one or two rows of gear teeth.

Various of the features of the invention are set forth in the following claims.

What is claimed is:

1. An endless track comprising a plurality of spaced and transversely extending traction bars each having a central offset drive section, a pair of flexible belts secured to said traction bars such that said traction bars extend substantially at right angles to the length of said belts and along the outside surface thereof for substantially the entire width of said belts, and such that said belts are located in spaced parallel relation to each other outwardly of said offset drive sections, said belts each including adjacently located diagonally cut substantially abutting ends secured to at least two of said traction bars, said belts having along the outside thereof longitudinally extending and outwardly projecting ribs.

* * * * *